United States Patent

Satake et al.

Patent Number: 5,501,914
Date of Patent: Mar. 26, 1996

[54] SOLID OXIDE ELECTROLYTE FUEL CELL

[75] Inventors: Tokuki Satake; Fusayuki Nanjo; Kiyoshi Watanabe; Shigeaki Yamamuro, all of Kobe, Japan

[73] Assignee: Mitsubishi Jukogyo Kabushiki Kaisha, Tokyo, Japan

[21] Appl. No.: 296,134

[22] Filed: Aug. 26, 1994

[30] Foreign Application Priority Data

Sep. 1, 1993 [JP] Japan ................................ 5-217613

[51] Int. Cl.⁶ .......................... H01M 2/08; H01M 8/10
[52] U.S. Cl. ................................ 429/36; 429/30; 429/34
[58] Field of Search ............................. 429/30, 32, 34, 429/36

[56] References Cited

U.S. PATENT DOCUMENTS

| | | | |
|---|---|---|---|
| 4,476,198 | 10/1984 | Ackerman et al. | 429/34 |
| 4,799,936 | 1/1987 | Riley | 429/30 |
| 4,857,420 | 8/1989 | Mariole et al. | 429/30 |
| 5,169,731 | 12/1992 | Yoshimura et al. | 429/30 |
| 5,213,910 | 5/1993 | Yamada | 429/32 |
| 5,227,256 | 7/1993 | Marianowski et al. | 429/16 |

FOREIGN PATENT DOCUMENTS

| | | |
|---|---|---|
| 5-6048 | 11/1994 | Japan . |
| WO92/09116 | 5/1992 | WIPO . |

OTHER PUBLICATIONS

"Fuel Cell Power Generating System", publication issued Oct. 20, 1992, and partial translation of relevant portion.
Patent Abstracts of Japan, vol. 15, No. 40 (E–102), 30 Jan. 1991, & JP–A–02 276166 (Tonen Corp) 13 Nov. 1990.
Patent Abstracts of Japan, vol. 15, No. 371 (E–1113), 18 Sep. 1991 & JP–A–03 147267 (Sanyo Electric Co., Ltd.) 24 Jun. 1991.
Patent Abstracts of Japan, vol. 13, No. 371 (E–807), 17 Aug. 1989 & JP–A–01 124964 (Mitsubishi Heavy Ind., Ltd.) 17 May 1989.
Patent Abstracts of Japan, vol. 15, No. 316 (E–109), 12 Aug. 1991 & JP–A–03 116659 (Fuji Electric Co., Ltd.) 17 May 1991.
Patent Abstracts of Japan, vol. 14, No. 493 (E–0995), 26 Oct. 1990 & JP–A–02 204974 (Mitsubishi Heavy Ind., Ltd.) 14 Aug. 1990.

Primary Examiner—Stephen Kalafut
Assistant Examiner—Carol Chaney
Attorney, Agent, or Firm—Wenderoth, Lind & Ponack

[57] ABSTRACT

A solid oxide electrolyte fuel cell comprises a power generation film consisting of a solid oxide electrolyte film dimpled over substantially the whole area on both sides thereof, an oxygen electrode formed on one side thereof, and a fuel electrode formed on the other side of thereof, and comprises a pair of interconnectors located on both sides of the power generation film. Furthermore, this invention adopts a seal structure for sealing each side of the power generation film to each of the corresponding interconnectors. The peripheral area of the power generation film is provided with a seal face with the interconnector and is formed to lie in essentially the same plane as the apices of the dimpled pattern formed on the power generation film, and the provided seal section has approximately the same thermal expansion coefficient as the solid oxide electrolyte film which forms the power generation film.

7 Claims, 5 Drawing Sheets

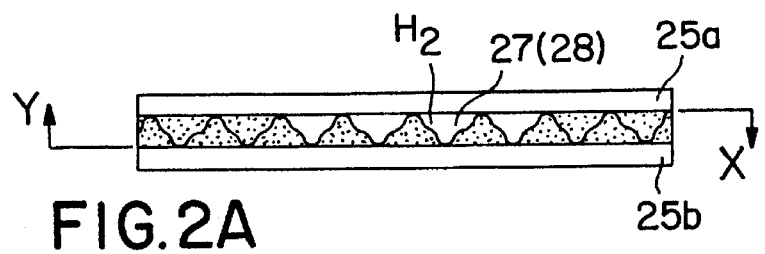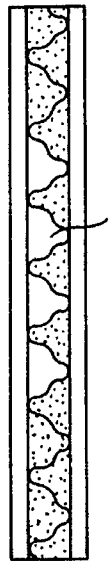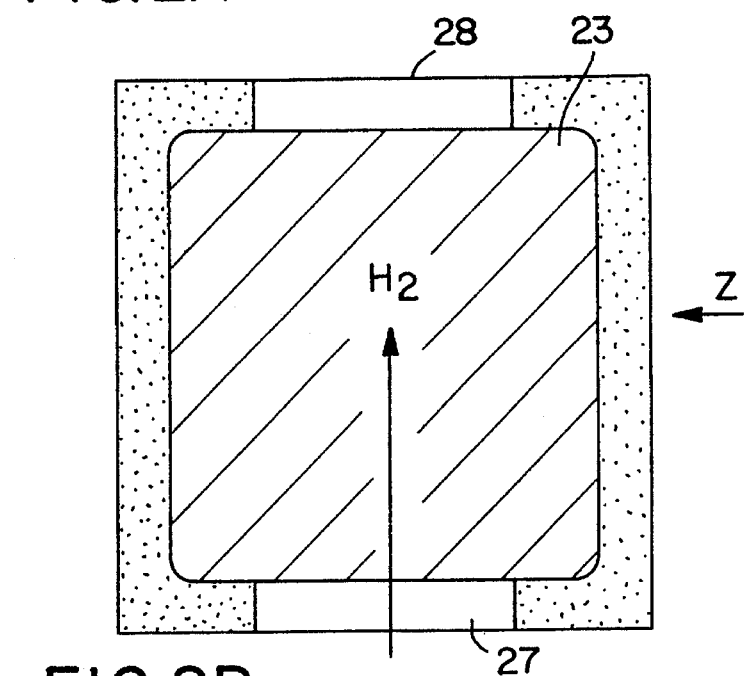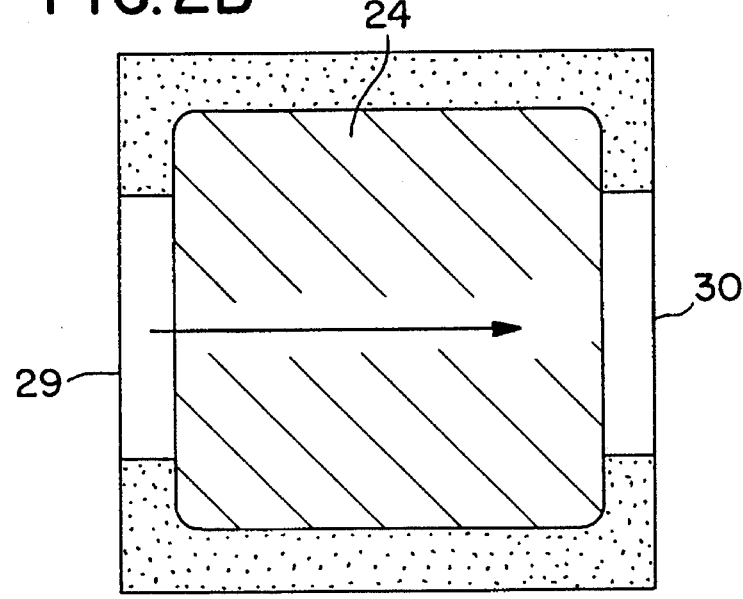

SOLID OXIDE ELECTROLYTE FUEL CELL

BACKGROUND OF THE INVENTION

1. Field of the Invention

This invention relates to a solid oxide electrolyte fuel cell (hereinafter referred to simply as "SOFC"), and more particularly to an SOFC which is applicable to an electrolytic cell in water electrolysis and $CO_2$ electrolysis, as well as to power generation.

2. Description of the Related Art

A typical example of a conventional plate type SOFC is shown in FIGS. 3 and 4. FIG. 3 shows a perspective view of disassembly of the conventional plate type SOFC, and FIG. 4 shows a perspective view of the assembly thereof. In the figures, the reference numeral 1 denotes a power generation film consisting of a solid oxide electrolyte film 2, an oxygen electrode 3, which is provided on the upper surface of the solid oxide electrolyte film 2, and a fuel electrode (not shown), which is provided on the under surface of the solid oxide electrolyte film 2.

An interconnector 6 is provided on the upper surface of the power generation film 1 through a corrugated air electrode side support 4 and packings 5,5, divided into two pieces to hold the air electrode side support 4 from both sides. When laminated, the air electrode side support 4 is held between the packings 5,5.

Further, the reference numeral 7 denotes an air inlet provided at the side gap of the packings 5,5. An air outlet (not shown) is provided at the other side gap of the packings 5,5, opposed to the air inlet 7.

Furthermore, on the under surface of the power generation film 1, there is provided an interconnector 10 through a fuel electrode side support 8 having a corrugated shape in perpendicular direction against the air electrode side support 4, and packings 9,9, divided into two pieces to hold the fuel electrode side support 8 from both sides. Accordingly, when laminated, the fuel electrode side support 8 is held between the packings 9,9. The reference numerals 11 and 12 denote a fuel inlet and a fuel outlet, respectively, provided at both side gaps between the packings 9,9.

The flow of fuel is in a perpendicular direction to that of air, that is, the fuel is introduced from the inlet 11 and flows into the fuel outlet 12 over both surfaces of the fuel electrode side support 8, and air is introduced from the air inlet 7 and flows into the air outlet (not shown) over both surfaces of the air electrode side support 4.

The formed cell is generally laminated to several layers to increase output. That is, to increase the output, air electrode side components such as packings 5,5 and an air electrode side support 4 are mounted on the under surface of the interconnector 10, and an oxygen electrode 3 of a power generation film 1 is provided under the air electrode side components. Furthermore fuel electrode side components such as packings 9,9 and a fuel electrode side support 8 are mounted on the upper surface of interconnector 6, and a fuel electrode of power generation film 1 is provided above the fuel electrode side components. In this manner, the lamination succeeds to increase the output.

As described above, a conventional SOFC needs to be provided with supports 4, 8, and packings 5,5 and 9,9 at the air electrode side and fuel electrode side, respectively, in addition to the power generation film 1 and interconnectors 6,10. The configuration increases the number of components, which increases the work steps to fabricate components and which takes time for assembling a cell. To solve the problems, an invention which eliminated the supports 4,8, was disclosed in Japanese Patent Application Hei 5-6048 of "Solid Oxide Electrolyte Fuel Cell", filed by the applicant of the present invention. The above invention is characterized by an electrical joint of a power generation film having a dimpled pattern with an interconnector.

The device disclosed in the above-identified Japanese application has, however, the following problems:

(1) Packings which hold a power generation film having a dimpled pattern are necessary to be disposed between interconnectors as illustrated in FIGS. 3 and 4. If the packings are made from a rigid material, extreme accuracy in the height of the individual dimples on the power generation film is required. However, such an accuracy is extremely difficult to obtain in the present processing technology for the power generation film. If the packings are fabricated from a soft material, various problems arise caused by the gas permeability of the packing material itself.

(2) Further, in the type shown in FIGS. 3 and 4, which introduces and discharges air and fuel from both sides of the cell, the air inlet 7 and outlet need be added, compared with the type illustrated in FIG. 5 where the air is introduced and discharged from the top and bottom of the cell. In addition, a solid oxide electrolyte film is required to reduce its thickness to increase the ion conductivity. A thin structure may induce a problem of strength at the openings of the air inlet and outlet. As a result, the openings need to be reinforced using a support such as a round tube. The countermeasures increase the number of components and increase the time for fabricating and assembling them.

(3) A conventional configuration requires the power generation film to have a flat shape at the region sandwiched by packings even though the power generation film is dimpled as a whole. The requirement makes the fabrication of power generation film further difficult because the power generation film contracts to approximately 70% during the firing process compared with that before firing to have a specified cell.

The object of the invention is to solve the problems described above and to provide a solid oxide electrolyte fuel cell which does not need special packing and which simplifies the manufacturing process thereof. Moreover, even when air and fuel are introduced and discharged from the sides of the cell, the openings as the inlet and outlet should not need special support.

SUMMARY OF THE INVENTION

A solid oxide electrolyte fuel cell of the invention comprises a power generation film consisting of a solid oxide electrolyte film dimpled over substantially the whole area on both sides thereof, an oxygen electrode formed on one side thereof, and a fuel electrode formed on the other side thereof, and comprises a pair of interconnectors provided on both sides of the power generation film. Furthermore, this invention adopts a seal structure for sealing each side of the power generation film and each of the corresponding interconnectors to achieve the above-described object.

The peripheral area on the power generation film forms a seal face with the interconnector and is formed to lie in essentially the same plane with that of the dimpled pattern formed on the power generation film. The provided seal section has approximately the same thermal expansion coefficient with the solid oxide electrolyte film which forms the power generation film.

According to the invention, the solid oxide electrolyte film is processed to have a dimpled pattern on substantially the entire surface area thereof, and is calcined. After calcination, considering the thermal expansion coefficient, a slurry of a material the same as the solid oxide electrolyte film or of a mixture with the material of the interconnector, or of a material similar to both is filled in the concave zone for forming a gas tight zone, and is fired to form a seal section. The joint with the interconnector is formed by either one of the following two methods: (1) Joining with an adhesive (normally a glass adhesive is used), or (2) Diffusion joining which is conducted by pressing and heating the seal section during the complete firing stage.

With the above means, an SOFC having a simplified cell structure and improved reliability is obtained.

Since this invention uses a solvent and a curing agent as well as YSZ (yttrior stabilized zirconia) fine particles during the preparation process of the solid oxide electrolyte film used in an SOFC, the green shape contracts at an approximate degree of 30% during the complete firing stage.

This invention provides an SOFC which does not need special packing and which simplifies the manufacturing process thereof. Even when air and fuel are introduced to and discharged from the sides of the cell, the openings for the inlet and outlet of air and fuel do not need special support.

BRIEF DESCRIPTION OF THE DRAWINGS

FIG. 1 is an explanatory drawing of an SOFC of an embodiment of the invention.

FIG. 2 is an assembled drawing of the SOFC of FIG. 1. FIG. 2(A) is a cross-sectional view of the SOFC after lamination. FIG. 2(B) is the view X of FIG. 2(A). FIG. 2(C) is the view Z of FIG. 2(B). FIG. 2(D) is the view Y of FIG. 2(A).

DETAILED DESCRIPTION OF THE PREFERRED EMBODIMENT

A preferred embodiment of this invention is described below with reference to the drawings.

Figure 1A:
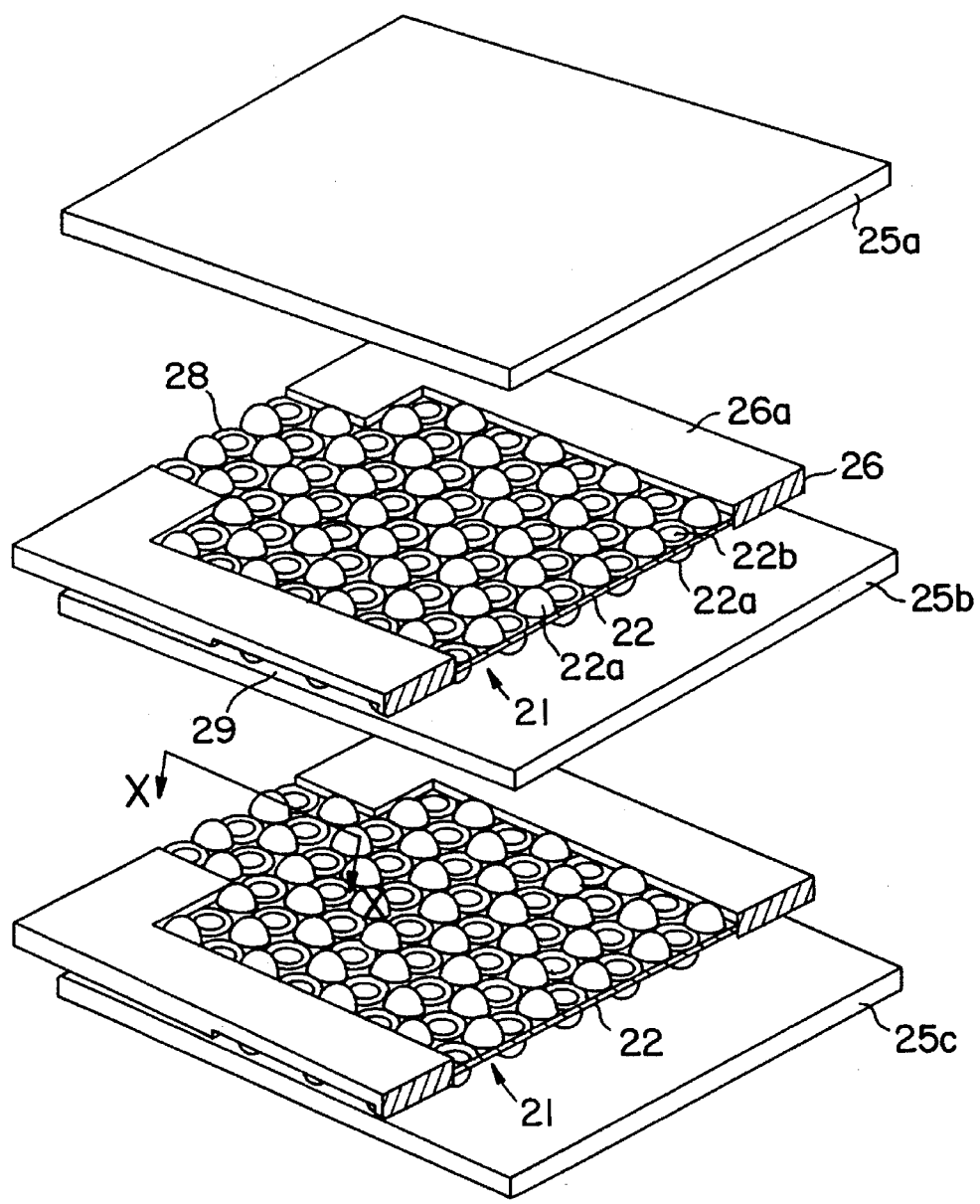
FIG. 1(A) is a perspective view of a disassembled SOFC.
Figure 1B:
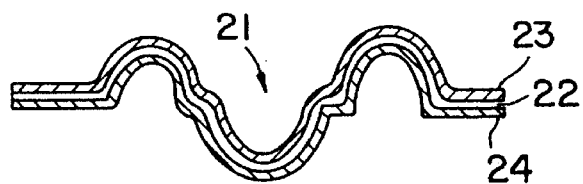
FIG. 1(B) is a cross-sectional view of the power generation film of FIG. 1(A) along the X—X line.
Figure 3:
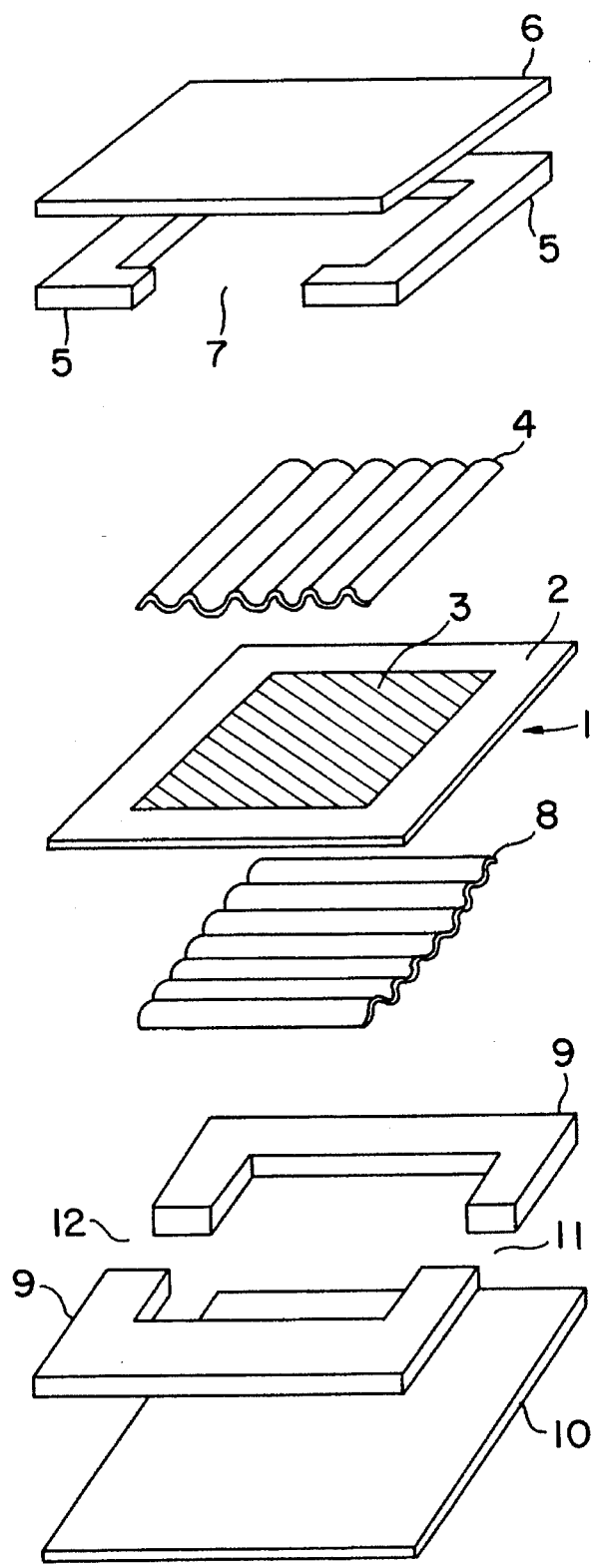
FIG. 3 is a perspective view of a disassembled SOFC of the prior art.
Figure 4:
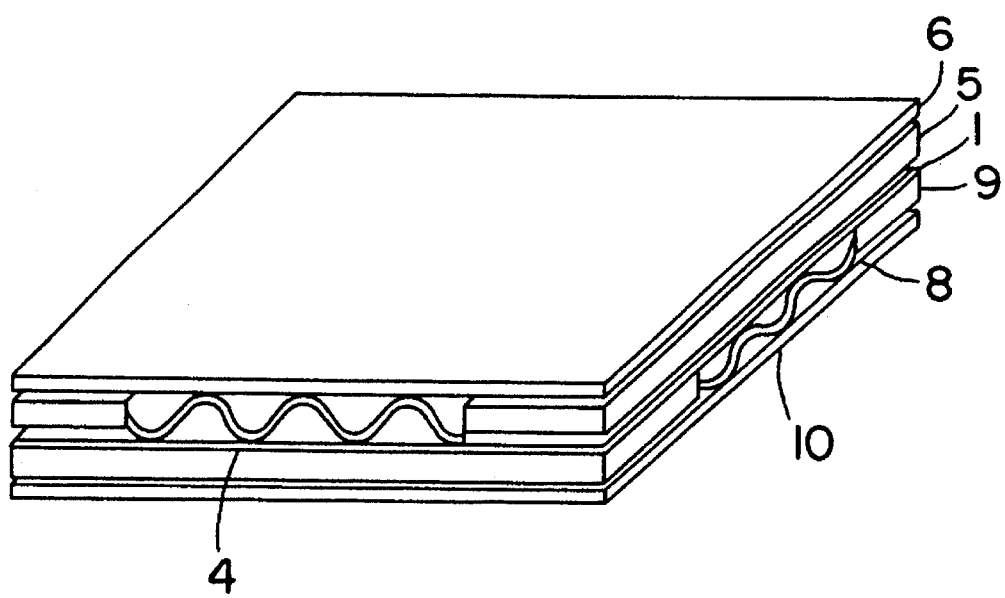
FIG. 4 is a perspective view of an assembled SOFC of FIG. 3.
Figure 5:
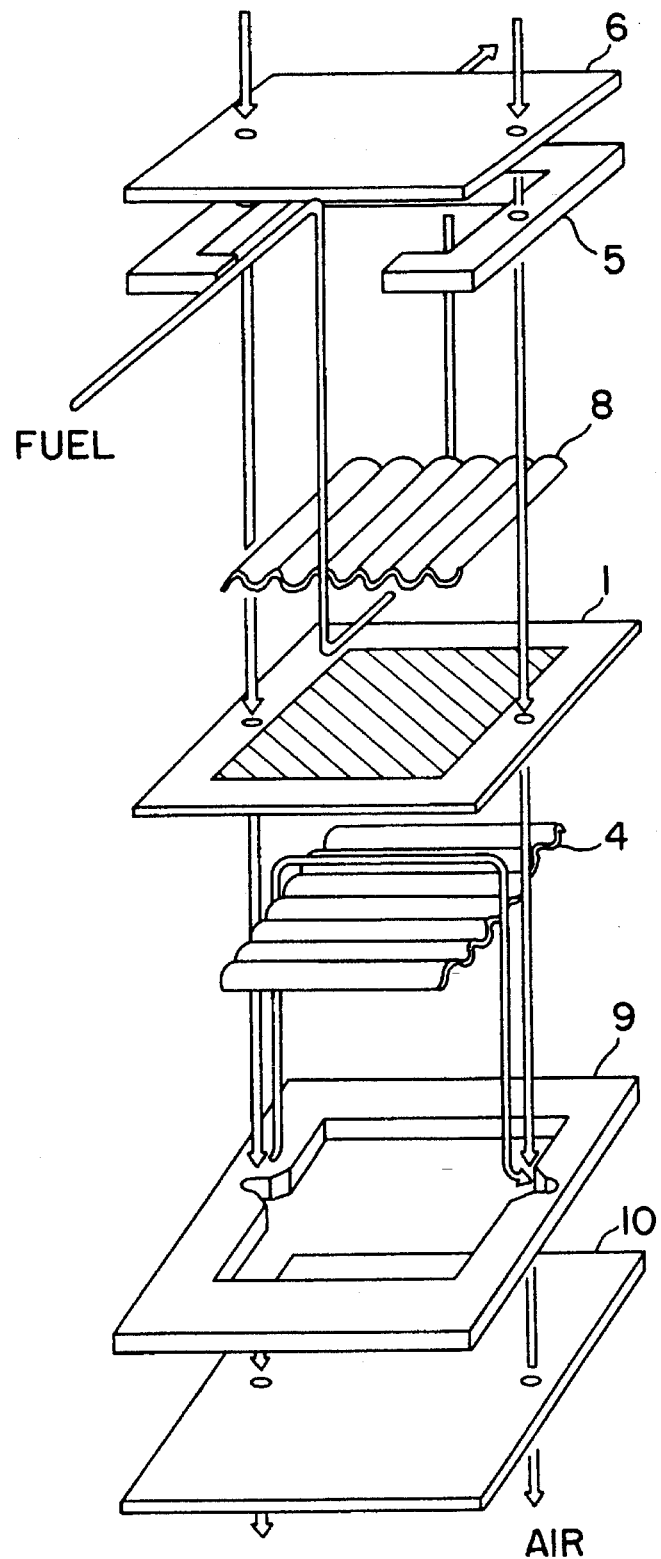
FIG. 5 is a perspective view of a disassembled SOFC of another type of prior art.

In FIG. 1, the reference numeral 21 denotes a power generation film which consists of a solid oxide electrolyte film 22 provided with dimple convex zone 22a and dimple concave zone 22b on both sides thereof, a fuel electrode 23 and an oxygen electrode 24 formed on both sides of the solid oxide electrode film 23, respectively. The dimple convex zone 22a and the dimple concave zone 22b have about the same shape. At the periphery of the power generation film 21, there are located seal sections 26 which form the seal faces 26a to seal between the interconnectors 25a, 25b, and 25c. The seal face 26a at the seal section 26 is smoothly shaped to lie in essentially the same plane as the apices of the dimple convex zone 22a. The seal face 26a is made of a material having a nearly equal thermal expansion coefficient as that of the solid oxide electrolyte film 22.

The SOFC having the above-described structure is manufactured by the following procedure.

First, the solid oxide electrolyte film 22 is prepared. Fine particles of YSZ, a binder such as PVB, a plasticizer, a dispersant, and a solvent such as ethanol are blended together. The mixture is dried to form a flat green sheet using a doctor blade unit. The green sheet is molded in a die to give a specified dimple pattern, which is then subjected to a temporary calcination at approximately 1250° C.

Next, the fuel electrode 23 is formed on one side of the prepared solid oxide electrolyte film 22. The material of the fuel electrode 23 is usually a Ni mixed with YSZ at a ratio of 30% to 60% to the total quantity. The mixture is slurried and applied onto one side of the solid oxide electrolyte film 22 at an approximate thickness of 50 μm (after firing). After drying the applied mixture, it is fired. Since the firing temperature is 1400° C., the firing is preferably conducted after the complete firing of the solid oxide electrolyte film 22.

Further, the oxygen electrode is formed on the other side of the solid oxide electrolyte film 22. The material for the oxygen electrode 24 is LSM mixed with YSM at a ratio of 20% to the total quantity. In a similar manner with that of the fuel electrode 23 preparation, the mixture of LSM and YSM is slurried and applied onto the other side of the solid oxide electrolyte film 22 at an approximate thickness of 50 μm (after firing). After drying the applied mixture, it is fired. Since the firing temperature is 1300° C., the firing may be conducted simultaneously with the heating of an adhesive or a dispersant on the seal face 26a described later.

Next is the formation of the seal section at the periphery of the power generation film 21 prepared by the above-described procedure. The seal section is prepared using a mixture similar to that used to form the solid oxide electrolyte film 22.

The seal section 26 has gaps at the points corresponding to the hydrogen inlet 27, the hydrogen outlet 28, the air inlet 29, and the air outlet 30. Since the passages of hydrogen and of air are formed crossing each other, the seal mixture is applied on both sides of the power generation film 21 at a dotted region in FIG. 2. Accordingly, each zone of hydrogen inlet 27, hydrogen outlet 28, air inlet 29, and air outlet 30 is formed by applying the mixture on only one side of the power generation film 21 and by ensuring smoothness using a pad plate for weight. After drying, the seal section is formed by firing at a temperature ranging from 1400° to 1500° C. The final state is shown in FIG. 1.

Then the seal face 26a is applied with an adhesive (glass group) or a dispersant (YSZ plus LSC used in interconnector), and an adhesive for the electrode is further applied at the dimple convex zone 22a and dimple concave zone 22b, which components are then heated and pressurized at 1200° to 1300° C. to adhere or join together at multiple sites to obtain an integrated unit of the power generation film 21 and the seal section 26 with the interconnectors 25a, 25b and 25c.

As shown in FIG. 1 and FIG. 2, the SOFC of this embodiment has a structure having the power generation film 21 which consists of the solid oxide electrolyte film 22 provided with the dimple convex zone 22a and the dimple concave zone 22b over substantially the whole surface area on both sides thereof, the fuel electrode 23 and the oxygen electrode 24 formed on each side of the solid oxide electrolyte film 22, respectively, and consists of the interconnectors 25a, 25b, and 25c located on both sides of the power generation film 21, and of the seal section 26 which is formed at the region to form the seal face at the periphery of power generation film 21 and between the interconnectors 25a, 25b, and 25c and which is made from a material having a thermal expansion coefficient nearly equal to that of the solid oxide electrolyte film 22.

As a result, this invention provides the following effects.

The SOFC of this invention assures a highly accurate seal face, enables tight adhesion between the interconnectors 25a, 25b, and 25c and the solid oxide electrolyte film 22, and improves the accuracy of adhesion between the electrode of the power generation film 21 and the interconnectors 25a, 25b, and 25c, which provides a cell with high reliability.

As for the method to provide a solid oxide electrolyte film 22 with a dimple pattern, the embodiment described above which applies the dimple pattern over substantially the whole surface area significantly simplifies the manufacture of the solid oxide electrolyte film 22 compared with the conventional method which leaves a flat area to secure the seal face. The production yield of a conventional method is only 30 to 50%, and the method described in the embodiment gives nearly 100%. Furthermore, since there is no need for mounting a special component at the inlet and outlet of gases, the reliability of the manufacturing process is improved and the number of processing manhours is reduced.

Since the separation between dimples is relatively small at around 3 mm and since a single solid oxide electrolyte film face contains lots of dimples, the height of each apex of the dimple convex zone does not match in some cases. Consequently, if the packing were made of a rigid material for sandwiching a solid oxide electrolyte (power generation film) between interconnectors to join them together, then, a problem would arise in electrical connection between the electrode and the interconnectors. On the contrary, if the packing is made of a soft material, the packing itself allows gas to permeate disadvantageously. As a result, the prior art has various difficulties regarding sealing ability.

On the other hand, according to an embodiment of the invention described above, a solid oxide electrolyte film is first calcined, then a slurried material which has the same thermal expansion coefficient as that of the solid oxide electrolyte film, an YSZ or an LSC of the same material as the interconnector, or their mixture in this case, is applied onto the specified seal face, and a pad plate is placed on the applied mixture layer to heat to completely fire. Thus a solid oxide electrolyte film provided with a seal face of uniform height over the whole surface area thereof is obtained.

What is claimed is:

1. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section defining openings therein and having opposing faces effective to join said power generation film to said two interconnectors at said opposing faces of said sealing section and said dimples projecting from said opposing sides;

wherein said dimples of said power generation film are dome-shaped.

2. The solid oxide electrolyte fuel cell as claimed in claim 1, wherein the apices of said dome-shaped dimples on one side of said power generation film define a plane, and said faces of said sealing sections on said one side of the power generation film lie in said plane.

3. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section defining openings therein and having opposing faces effective to join said power generation film to said two interconnectors at said opposing faces of said sealing section and said dimples projecting from said opposing sides;

wherein the material composing said sealing section has the same coefficient of thermal expansion as said solid oxide electrolyte film.

4. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section defining openings therein and having opposing faces effective to join said power generation film to said two interconnectors at said opposing faces of said sealing section and said dimples projecting from said opposing sides;

wherein the material composing said sealing section is the same as the material composing said solid oxide electrolyte film.

5. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section defining openings therein and having opposing faces effective to join said power generation film to said two interconnectors at said opposing faces of said sealing section and said dimples projecting from said opposing sides;

wherein the material composing said sealing section is the same as the material composing said interconnectors.

6. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section defining openings therein and having opposing faces effective to join said power generation film to said two interconnectors at said opposing faces of said sealing section and said dimples projecting from said opposing sides;

wherein said sealing section of said power generation film is joined to said two interconnectors with an adhesive or dispersant agent, and wherein said dimples on said opposing sides of said power generation film are joined to said two interconnectors with an electrode adhesive.

7. A solid oxide electrolyte fuel cell comprising:

a power generation film having opposing sides and a periphery, said power generation film comprising a solid oxide electrolyte film, an oxygen electrode formed on one side of said solid oxide electrolyte film, and a fuel electrode formed on the other side of said solid oxide electrolyte film, and said power generation film having a plurality of dimples projecting from each of said opposing sides;

two interconnectors, one provided on each of said opposing sides of said power generation film; and a sealing section located at and integrally formed with said periphery of said power generation film, said sealing section having opposing faces joining with and sealing with said two interconnectors on said opposite sides of said power generation film section;

wherein the apices of said dimples on each side of said power generation film form respective planes, and said opposing faces of said sealing section lying in said respective planes; and wherein said sealing section has the same coefficient of thermal expansion as said solid oxide electrolyte film.

* * * * *